United States Patent
Li et al.

(10) Patent No.: US 10,169,655 B2
(45) Date of Patent: Jan. 1, 2019

(54) DETECTION OF LOGOS IN A SEQUENCE OF VIDEO FRAMES

(71) Applicant: ARRIS Enterprises LLC, Suwanee, GA (US)

(72) Inventors: Renxiang Li, Lake Zurich, IL (US); Faisal Ishtiaq, Plainfield, IL (US)

(73) Assignee: ARRIS Enterprises LLC, Suwanee, GA (US)

(*) Notice: Subject to any disclaimer, the term of this patent is extended or adjusted under 35 U.S.C. 154(b) by 64 days.

(21) Appl. No.: 15/365,231

(22) Filed: Nov. 30, 2016

(65) Prior Publication Data
US 2018/0150696 A1   May 31, 2018

(51) Int. Cl.
G06K 9/00 (2006.01)
G06K 9/62 (2006.01)

(52) U.S. Cl.
CPC ....... *G06K 9/00718* (2013.01); *G06K 9/6202* (2013.01); *G06K 9/6212* (2013.01); *G06K 2209/25* (2013.01)

(58) Field of Classification Search
CPC ............. G06K 9/00718; G06K 9/6212; G06K 9/6202; G06K 2209/25
See application file for complete search history.

(56) References Cited

U.S. PATENT DOCUMENTS

| | | | |
|---|---|---|---|
| 7,356,084 B2 | 4/2008 | Liu | |
| 2008/0181492 A1* | 7/2008 | Abe | H04N 19/14  382/165 |
| 2009/0251613 A1* | 10/2009 | Kervec | G06T 7/254  348/700 |
| 2014/0146071 A1 | 5/2014 | Kim | |
| 2014/0270504 A1 | 9/2014 | Baum | |
| 2016/0203388 A1 | 7/2016 | Li | |

OTHER PUBLICATIONS

Lu, T., and Ponnuthurai N. Suganthan. "An accumulation algorithm for video shot boundary detection." Multimedia Tools and Applications 22.1 (2004): 89-106. (Year: 2004).*

(Continued)

*Primary Examiner* — Bhavesh M Mehta
*Assistant Examiner* — Menatoallah Youssef
(74) *Attorney, Agent, or Firm* — Thomas A. Ward (57) ABSTRACT

A method is provided for detecting static graphical elements in a sequence of video frames that compares a selected frame in the sequence to each of a plurality of previous frames in the sequence to identify a graphical element that can be a logo. For each pair of frames compared, an absolute difference frame is determined by acquiring an absolute difference value between pixel values for corresponding pixels over at least a portion of the frames in the frame pair. A metric associated with each absolute difference frame is generated, which reflects a degree of dissimilarity. At least some of the absolute difference frames weighted in accordance with the metric associated therewith are summed to generate an accumulation difference frame such that pairs of frames that are more dissimilar have a greater weight. A static graphical element is then identified over a region of the accumulation difference frame in which pixel values satisfy specified criteria.

4 Claims, 10 Drawing Sheets

(56) References Cited

OTHER PUBLICATIONS

Katrin Meisinger, "Automatic TV Logo Removal Using Statistical Based Logo Detection and Frequency Selective Inpainting".
Ozay, et al., "Automatic TV Logo Detection and Classification in Broadcast Videos" 17th European Signal Processing Conference (EUSIPCO 2009) Glasgow, Scotland, Aug. 24-28, 2009, p. 839-843.
Santos, et al., "Real-Time Opaque and Semi-Transparent TV Logos Detection".

* cited by examiner

DETECTION OF LOGOS IN A SEQUENCE OF VIDEO FRAMES

BACKGROUND

Broadcast video content may include graphical elements such as branding logos. Such logos may be inserted by the content provider or distributor and generally appear in a static location in the video frames of video programs. For example, a broadcaster may insert their company logo in the lower-right corner of the video frames to indicate that the program was received from their transmission facilities. The logo typically remains present for an extended period of time (e.g. over multiple video frames) without change in intensity, color, pattern, location, etc.

Techniques have been developed for detecting static graphical elements logos within broadcast video content. For instance, techniques are available to detect semi-transparent logos using a semi-transparent edge detector. It is desirable to continue to provide improved systems to identify the presence or absence of graphical elements such as logos in video content, particularly in the case where the logos are opaque.

SUMMARY

In accordance with one aspect of the present disclosure, a method is provided for detecting a static graphical element in a sequence of video frames. In accordance with the method, a first selected frame in the sequence is compared to each of a plurality of previous frames in the sequence of video frames. For each pair of frames being compared, an absolute difference frame is determined. The absolute difference frame is obtained by acquiring an absolute value of a difference between pixel values for corresponding pixels over at least a portion of the frames in the pair of frames being compared. A metric associated with each absolute difference frame is generated. The metric is reflective of a degree to which the selected frame and the previous frame in each pair are dissimilar. At least a subset of the absolute difference frames weighted in accordance with the metric associated therewith is summed to generate an accumulation difference frame such that pairs of frames that are more dissimilar have a greater weight. At least one static graphical element is identified over a region of the accumulation difference frame in which pixels have values that satisfy one or more criteria.

In accordance with another aspect of the present disclosure, a static graphical element detector is provided. The static graphical element detector includes a selected frame memory for storing a selected frame received from a video source providing a video program that includes a sequence of video frames. A previous frame memory stores a plurality of previous frames that sequentially precede the selected frame in the sequence of video frames. At least one frame comparator receives the selected frame from the selected frame memory and previous frames from the previous frame memory. The frame comparator compares the selected frame in the sequence to each of a plurality of previous frames in the sequence of video frames to determine, for each pair of frames being compared, an absolute difference frame by acquiring an absolute value of a difference between pixel values for corresponding pixels over at least a portion of the frames in the pair of frames being compared. The frame comparator also generates from each absolute difference frame a metric associated therewith. The metric is reflective of a degree to which the selected frame and the previous frame in each pair are dissimilar. A difference frame accumulator receives the absolute difference frames and the metrics associated therewith from the at least one frame comparator. The difference frame accumulator sums at least a subset of the absolute difference frames weighted in accordance with the metric associated therewith to generate an accumulation difference frame such that pairs of frames that are more dissimilar have a greater weight. A graphical element mask generator identifies at least one static graphical element over a region of the accumulation difference frame in which pixels have values that satisfy one or more criteria.

DETAILED DESCRIPTION

Described herein are techniques for a logo detection system. Particular embodiments automatically identify and track a logo that appears in video content. For example, particular embodiments can track a branding logo's position and size without any prior knowledge about the logo, such as the position, type, structure, and content of the logo.

An entity such as a television station or content owner may add a branding logo for the brand of the entity that is offering the video program to users. In some cases the branding logo is added to the original video content as an opaque overlay. While the discussion herein will reference a logo or branding logo, it will be understood that a logo may be any graphic that is included as an overlay on video content. Moreover, for purposes of this discussion the logo will be assumed to be opaque.

Figure 1:
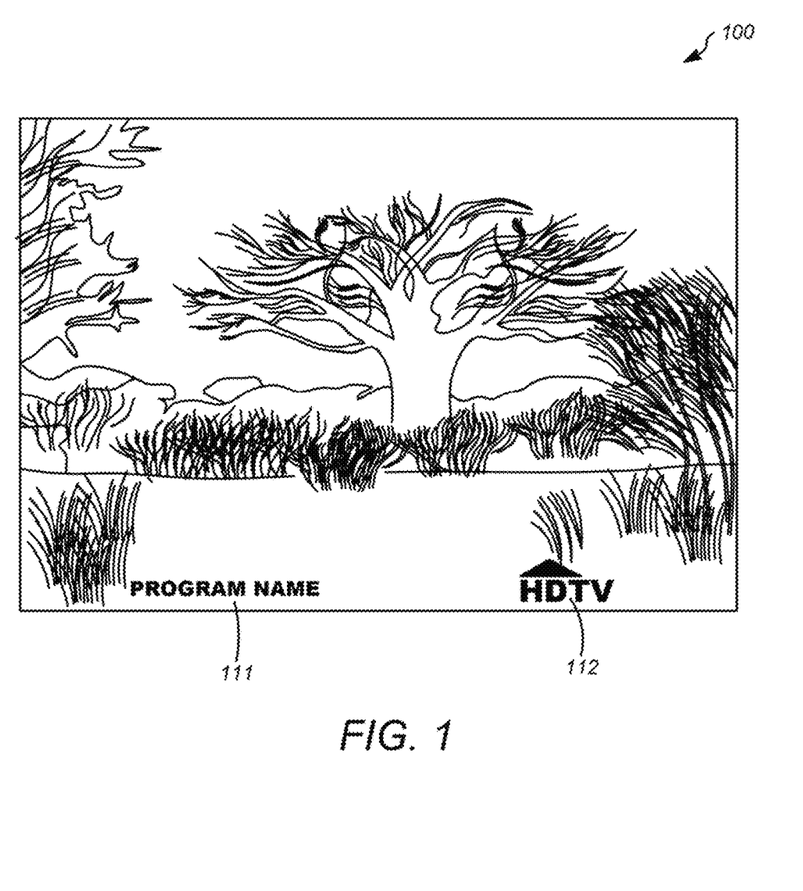
FIG. 1 depicts an example frame or image having graphical elements such as logos.

FIG. 1 depicts an example frame or image 100 having graphical elements such as logos. A proprietary rights logo 112 and a graphic providing program identification logo 111 are visible within the image 100. Notably, the rights logo 112 is opaque, or, in some cases, semi-transparent. The frame or image 100 may be a part of a series of images, frames or pictures that define a video content item such as a broadcast program or the like. For discussion purposes the term frame will be used herein, but it may refer interchangeably with the terms picture, image, or other portion of a video content item. Frames may be identified by frame numbers within a video content item. For instance, the frame 100 shown in FIG. 1 may be frame #447 that is 15 seconds into the video content. Other identifiers may also be used, such as the time within the video content item at which the frame appears.

It is well known that logos can be detected by comparing pixel values in successive frames of a video. Since the logo does not change over a relatively large number of frames, the difference in pixel values in the region of the logo will generally be close to zero and thus will appear to be black. However, this technique also detects static objects that may be in the video, which can make it difficult to distinguish between the logo and non-logo regions. This can be particularly problematic in the case of a static scene (e.g., a news studio) since the pixel value difference between frames may be small or near zero over large portions of the frame. That is, if a difference frame is generated on a pixel by pixel basis between two frames that are very similar, there will be large black regions over much of the difference frame and not just in the region of the logo. In the extreme case in which the two frames being compared are identical (a completely static scene), the entire difference frame will be black (or nearly black since there may be contributions from noise). In this case no information is available about the presence or location of a logo. As a result, a comparison of frames exhibiting a high degree of similarly makes logo detection difficult.

As explained in more detail below, embodiments of the present disclosure analyze a current frame in a video content item by comparing it to previous frames that are stored in a buffer. A difference frame is generated for each previous frame to which the current frame is compared. Those difference frames which indicate that the frames being compared are more different from one another are treated as being more important to the logo detection process than those difference frames which indicate that the frames being compared are more similar to one another. For instance, a comparison between two frames in which a scene change occurs between them will be treated as more important than a comparison between two frames that belong to the same, largely static scene. The larger the frame difference, the more likely that the accumulated frame differences at non-logo pixel positions have larger pixel values, and the less likely that the non-logo area have strong structural elements (e.g. edges or textures). Having large accumulated pixel values at non-logo pixel positions increases the contrast between the logo pixels (which is known to be near black) and non-logo pixels, thereby making the identification of logo pixels easier.

The relative importance of a difference frame may be quantified by assigning it a weight. Those difference frames that represent an overall small difference will be assigned a smaller weight, whereas difference frames that represent an overall larger difference will be assigned a larger weight. The relative weights may be derived in a number of different ways. In one embodiment that will be illustrated below, the relative weights are determined based on the statistics of the difference frame. For instance, the relative weights may be determined by taking into account the distribution of pixel value differences over the difference frame. It should be noted that the frames being compared may be arbitrarily far about in the sequence of frames that form the video content item. That is, the frames being compared are not necessarily temporally adjacent frames.

In some embodiments, pixel values as described herein can correspond to a luminance component value as is well known in the related arts. Use of the luminance component alone is sufficient for the purpose of logo presence/absence determination in many applications, and results in reduced computational complexity as compared to using multiple components, such as RGB (i.e., red, green, and blue), for the pixel value. In some embodiments a typical range for such luminance values can range from 0 to 1, corresponding respectively to a specified minimum luminance measure and a specified maximum luminance measure. In some embodiments a minimum to maximum range in an embodiment can respectively correspond to values coded as 0 to 255, which can advantageously correspond to 8-bit coding of the values. Ranges and coding for other parameters herein described can be implemented as is well known in the related arts. Although some specific embodiments utilizing luminance values for pixel values are described herein, the systems and methods herein disclosed are not necessarily so limited. Alternative embodiments utilizing any other known and/or convenient image pixel representation components and/or measures are understood to be within the scope and spirit of the described embodiments. If multiple components are chosen to represent a pixel value, the equations and processes of embodiments of the present invention can be applied to one of the multiple components, or can be applied to more than one of the components or some combination of the components.

One particular technique that may be used in some embodiments to calculate the relative weights that are assigned to difference frames will now be described. More generally, however, a wide variety of different techniques may be used to assign the weights.

First, during an initialization phase various thresholds are established. In particular, two pixel value thresholds T1 and T2 are chosen, where T2≥T1. T1 is defined such that if a pixel value difference (denoted d) is less than T1 (d<T1), the two pixel values being compared are deemed to be identical. T2, on the other hand, is defined such that if the pixel value difference is greater than T2 (d>T2), the two pixel values are deemed to be different. If T2≥d≥T1, whether the two pixel values are the same or different is indeterminate. The values of T1 and T2 can be determined in any of a variety of different ways. For instance, training data may be used to determine the most suitable values.

Two additional thresholds are also defined in the initialization phase, a weight threshold W and a pixel value threshold V. Suitable values for these thresholds may also be determined with the use of training data. The significance of these two thresholds will be described below when explaining subsequent stages of the overall process.

Next, the logo detection process begins when a buffer is filled with the first N frames of video content. A series of k difference frames, referred to herein as the absolute difference frame D(n,k), is obtained between the current frame n (e.g., the most recently received frame from the video source) and every buffered frame. That is, the current frame is associated with N absolute difference frames D(n,k)

wherein k=1, 2 ... N. The entries of the absolute difference frame D(n,k) are the absolute value of the pixel value differences between the current frame n and the buffered frame k.

Figure 2:
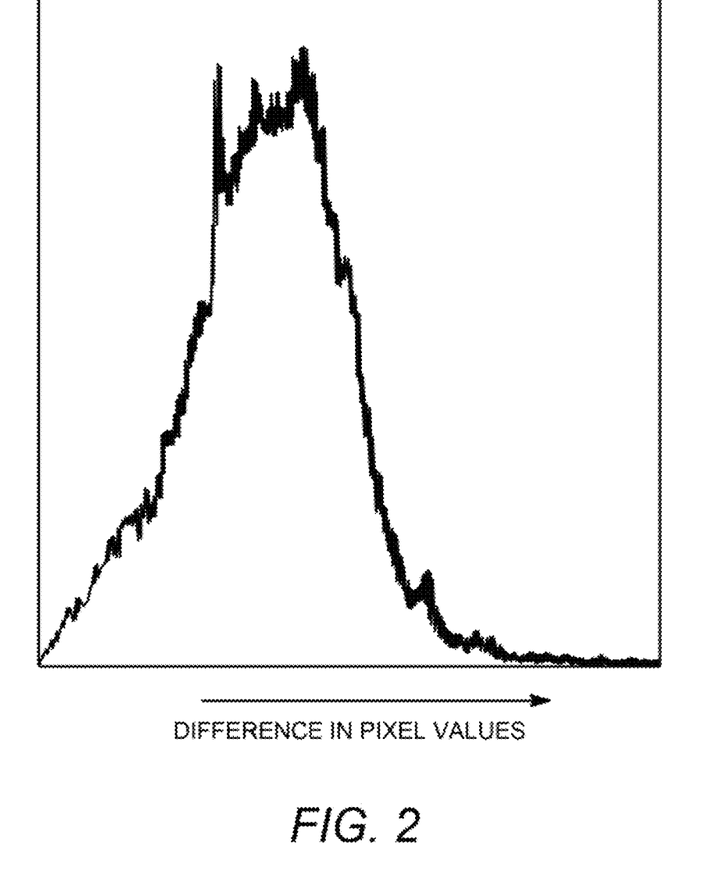
FIG. 2 shows an illustrative histogram representing the distribution of the difference in pixel values between corresponding pixels in the frames shown in FIGS. 3a (bottom portion) and 3b.
Figure 3A:
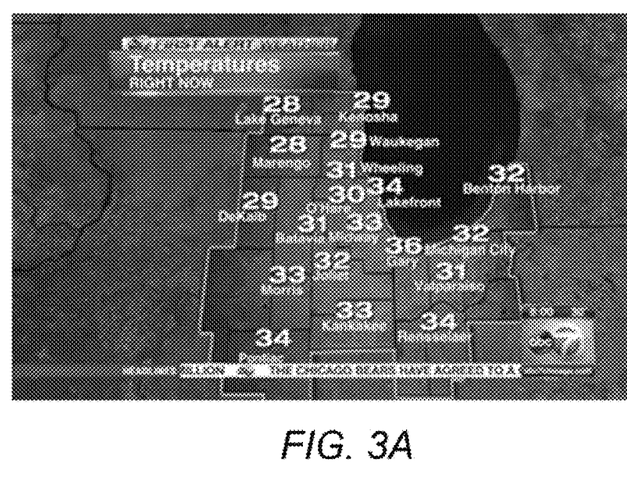
FIGS. 3a and 3b respectively show a current frame and the buffered frame to which it is compared.
Figure 3B:
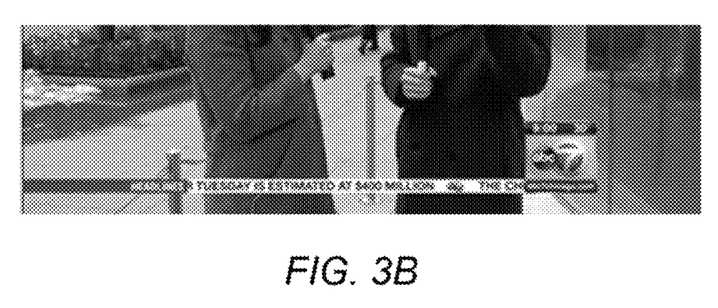

A histogram H is generated for each absolute difference frame D(n,k). The bins of the histogram represent a range of absolute pixel value differences. FIG. 2 shows an illustrative histogram, where the current frame n is shown in FIG. 3a and the buffered frame k to which it is compared shown in 3b. Note that in this example the absolute difference frame D(n,k) is only obtained for the bottom half of the frame since this is the frame region where a logo is most likely to be situated. More generally, however, the absolute difference frame D(n,k) may be obtained for a comparison between complete frames or any portion thereof, such as the bottom portion or the upper portion.

Note that an absolute difference frame D(n,k) between two frames that are very similar will have large number of absolute pixel values clustered in or near bin zero (assuming that as in FIG. 2 the absolute pixel value difference bins increase in value along the x-axis). In the example shown in FIG. 2 the absolute pixel difference values are distributed over a relatively wide range of bins, indicating that the frames being compared are relatively dissimilar. As FIGS. 3a and 3b show, the frames being compared are in fact obtained from different scenes and are significantly different from one another.

Next, for each histogram H two probability distributions are calculated, P(h<T2) and P(h>T1), where h is the histogram bin. The weight w(n,k) may now be defined as the ratio P(h>T1)/P(h<T2). Given this definition, the weight w(n,k) increases as the dissimilarity between frames being compared increases. Likewise, the weight w(n,k) decreases as the similarity between frames being compared increases.

For each current frame n an accumulation difference frame A is generated, where $$A(n) = A(n-1) + \sum_{k=1}^{N} w(n, k) * D(n, k)$$

if w(n,k)≥W and no accumulation of D(n,k) if w(n,k)≤W. Initially, for A(0), all pixel values are set to 0. In this way only absolute difference frames are accumulated which represent a comparison of relatively different frames (since only those difference frames with weights greater than a threshold contribute to A). As a result, the various contributions from each difference frame to the individual pixel value differences of the entries in the accumulation difference frame will cause most of the pixels to increase in luminance, except for those pixels in the logo area, which will remain near zero (low or no luminance) in value. As additional difference frames make contributions to the accumulation difference frame the contrast between the logo region and the non-logo regions will increase further. In this way the accumulation difference frame can be used to identify the logo region, which will correspond to the region(s) in which the pixel values have a luminance near zero.

Figure 4:
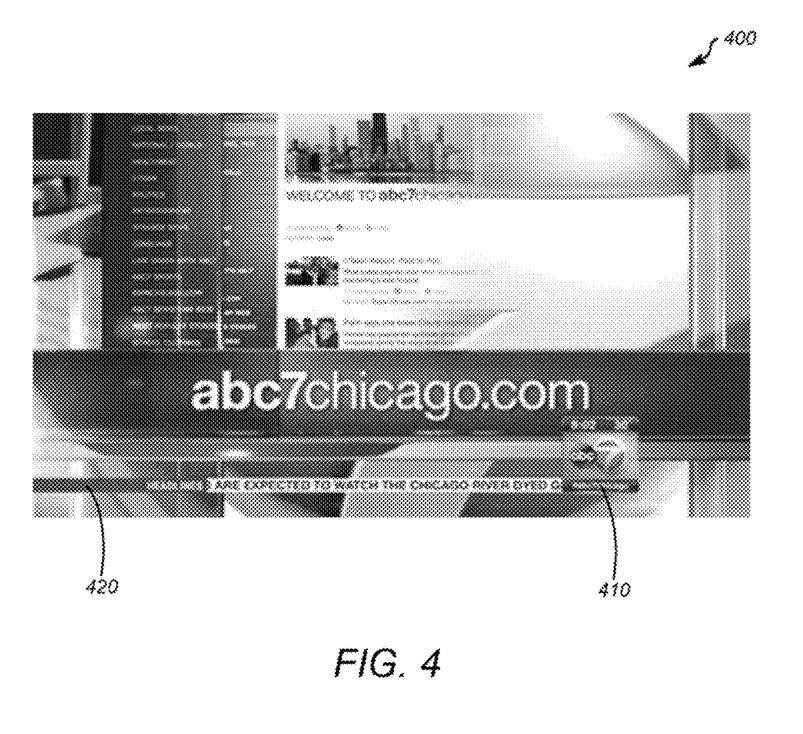
FIG. 4 shows a frame from a sequence of frames having two logo regions.
Figure 5A:
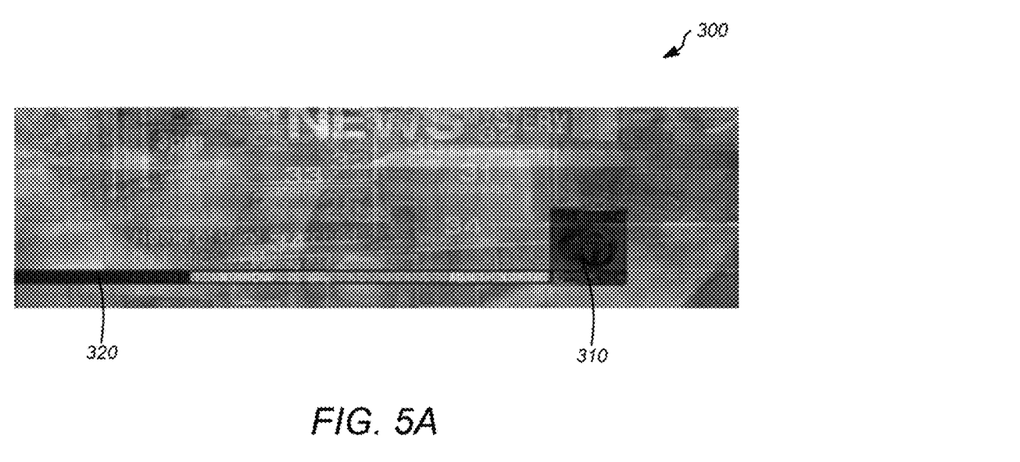
FIG. 5a shows the accumulation difference frame for the bottom half of the frame shown in FIG. 4.

FIG. 4 shows a frame 400 from a sequence of frames having two logo regions 410 and 420. FIG. 5a shows the accumulation difference frame 300 for the bottom half of the frame 400 shown in FIG. 4. The dark regions 310 and 320 clearly identify the logo regions 410 and 420 in the frame 400.

Figure 5B:
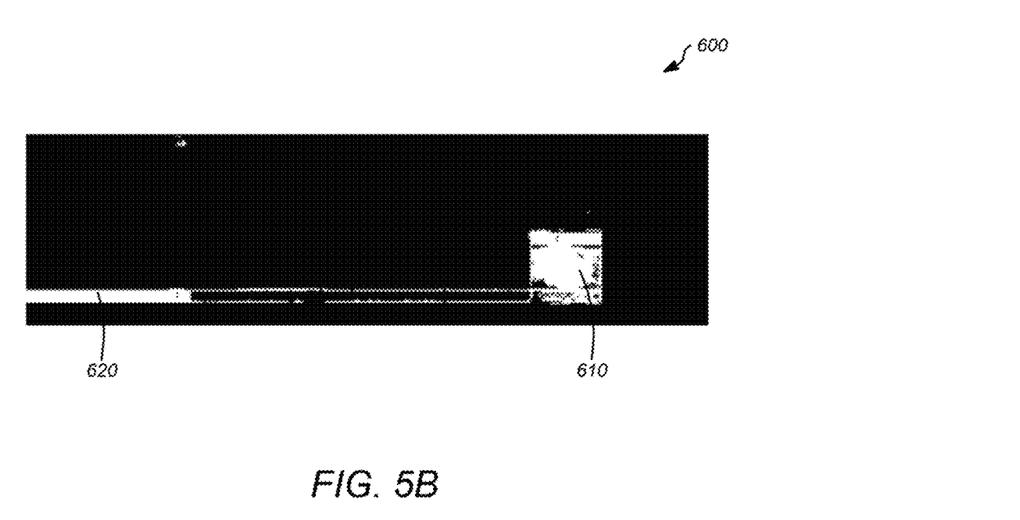
FIG. 5b shows the logo masks that are applied to the accumulation difference frame of FIG. 5a after image processing has been performed.

Once the logo region(s) have been identified, conventional image processing techniques may be used to generate a logo mask that specifies, for instance, the size, shape, location and/or pixel values of the logo region. These post-processing techniques may include, by way of example, threshold and morphological operations. In some cases contour analysis may be used to generate a bounding box for the mask and to refine the shape of the logo. FIG. 5b shows the logo masks, represented by the white regions 610 and 620, which are applied to the accumulation difference frame 300 of FIG. 5a after such image processing has been performed.

Figure 6A:
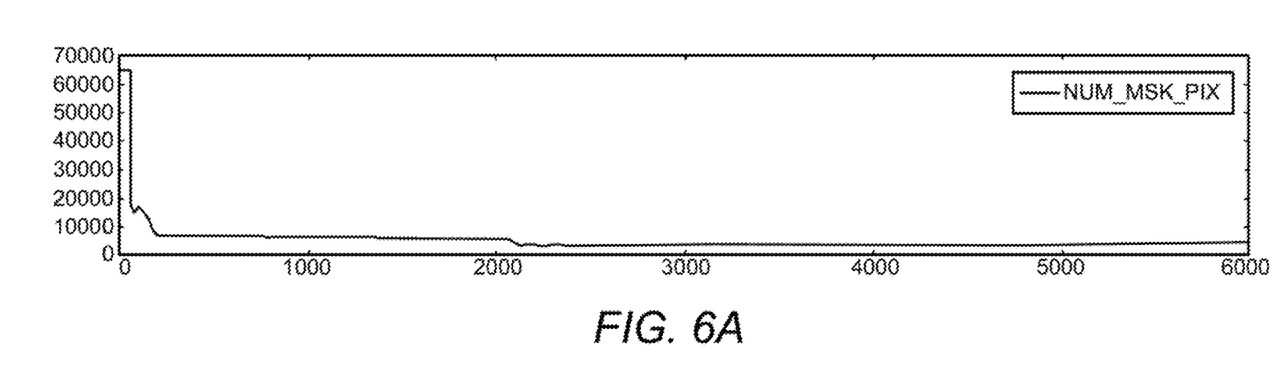
FIG. 6a shows a graph of the number of pixels encompassed by the masks shown in FIG. 5b versus the number of frames that have contributed to the accumulation difference frame.

Any of a number of different techniques may be used to confirm that a sufficient number of frames have been accumulated to generate a stable logo region and that the correct region has been identified as the logo region. Generally, techniques such as those shown herein in which the accumulation of frames converges to give rise more rapidly to a stable logo region will be particularly advantageous. One criteria that may be employed examines the total number of pixels encompassed by the logo mask(s) that has been generated. If a sufficient number of frames have been accumulated by the accumulation difference frame A, this number should converge or stabilize as contributions from additional frames are added to the accumulation difference frame. FIG. 6a shows a graph of the number of pixels encompassed by the masks shown in FIG. 5b versus the number of frames that have contributed to the accumulation difference frame A. As shown, when only a relatively small number of frames have been examined (less than 500 in this example), the number of pixels that have been identified as being associated with the logo region varies significantly. However, after additional frames have been accumulated (about 1,000 in this example), the number of pixels that are identified as being associated with the logo region stabilizes and converges to a constant value. This indicates that the logo region has been correctly identified and that a sufficient number of frames have been examined.

Another criterion that may be used to confirm that the correct logo region has been identified and stabilized is based on the recognition that if the logo region has been correctly identified, the pixels values in the logo region should not significantly change as more frames are examined since the logo represents a static image. This may be quantified by generating another accumulation frame in parallel with the accumulation difference frame. This additional accumulation frame matrix, denoted as accumulation frame F, is a matrix defined as $$F(n) = F(n-1) + \sum_{k=1}^{N} w(n, k) * Mn$$

if w(n,k)≥W, where Mn is a matrix of pixel values for the current frame n.

The accumulation frame F may be used as part of a convergence test by examining a convergence image |Mn−F| (where F is normalized) that is obtained for the logo region (but not for the non-logo region). In one embodiment, the sum of the pixel value differences over |Mn−F| is obtained only for the logo pixels (e.g. the white pixels 610 and 620 in FIG. 5B), and the average pixel value difference is calculated by dividing the sum of difference with the number of logo pixels. The convergence image represents the pixel value difference between the current frame Mn and the frames that have been accumulated. If the logo region has been correctly identified and a sufficient number of frames have been examined to stabilize the region, then the convergence image should not change as additional frames are examined and accumulated. Moreover, the since convergence frame |Mn−F| is only determined in the region that has been identified as the logo region, it should have luminance pixel values near zero. In one implementation, the accumulation frame is normalized by dividing F by the sum of all non-zero weights since the very beginning of the accumulation. In an alternative approach, the pixel value of F (which is usually floating point and much larger than the dynamic range of the 8-bit pixel value) may be scaled to the range of [0, 255].

In one alternative embodiment, the frame accumulation matrix F(n) may use a constant weight for each frame instead of the weight w(n,k).

Figure 6B:
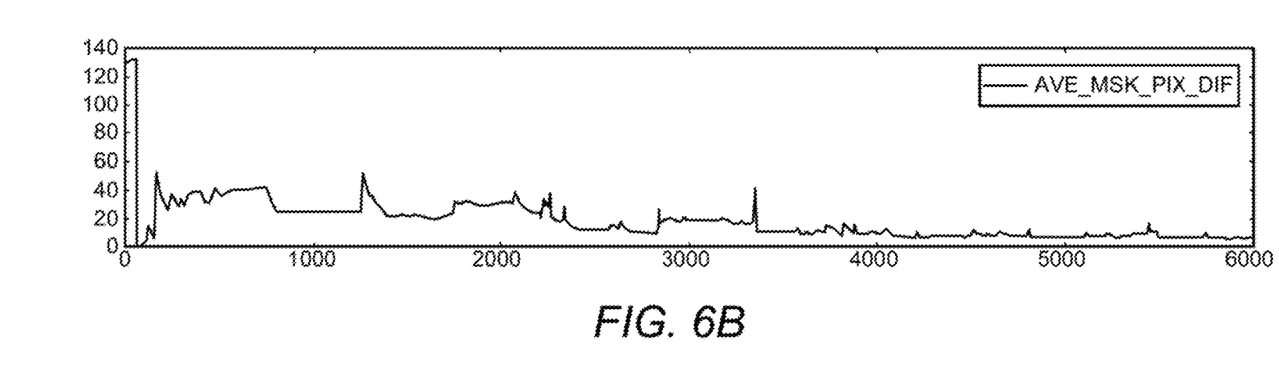
FIG. 6b shows a graph of the average pixel value difference for the pixels encompassed by the masks shown in FIG. 5b versus the number of frames that have contributed to the accumulation difference frame A.

FIG. 6b shows a graph of average pixel value difference for the pixels encompassed by the masks shown in FIG. 5b versus the number of frames that have contributed to the accumulation difference frame A. The average pixel value difference is obtained from the convergence image |Mn−F|. As shown, the average pixel value difference initially fluctuates around a relatively high level and eventually stabilizes. If this stable value for the convergence image |Mn−F| is sufficiently small, less than the threshold value V, then the region is most likely to have been correctly identified as a logo region. If the region that is identified as the logo region were to have been incorrectly identified and were to encompass non-logo pixels, the average pixel value difference shown in FIG. 6b would be expected to continue to fluctuate and not remain below the threshold level V. Accordingly, in this example, both the average pixel value difference in the identified logo region as shown in FIG. 6b and the number of pixels encompassed by the masks as shown in FIG. 6b may be used to conclude with a high confidence level that the logo region has been correctly identified. In some cases the fluctuations in the pixel value difference may be examined over specified periods of time. If the fluctuations during these intervals are sufficiently small, the logo region likely will have been correctly identified.

As previously mentioned, other criteria may be used instead of or in addition to those enumerated above for confirming that a sufficient number of frames have been accumulated to generate a stable logo region and that the correct region has been identified as the logo region. For instance, in one embodiment an edge detection process may be used to detect the edges of the logo region that has been detected and stabilized over time.

Figure 7:
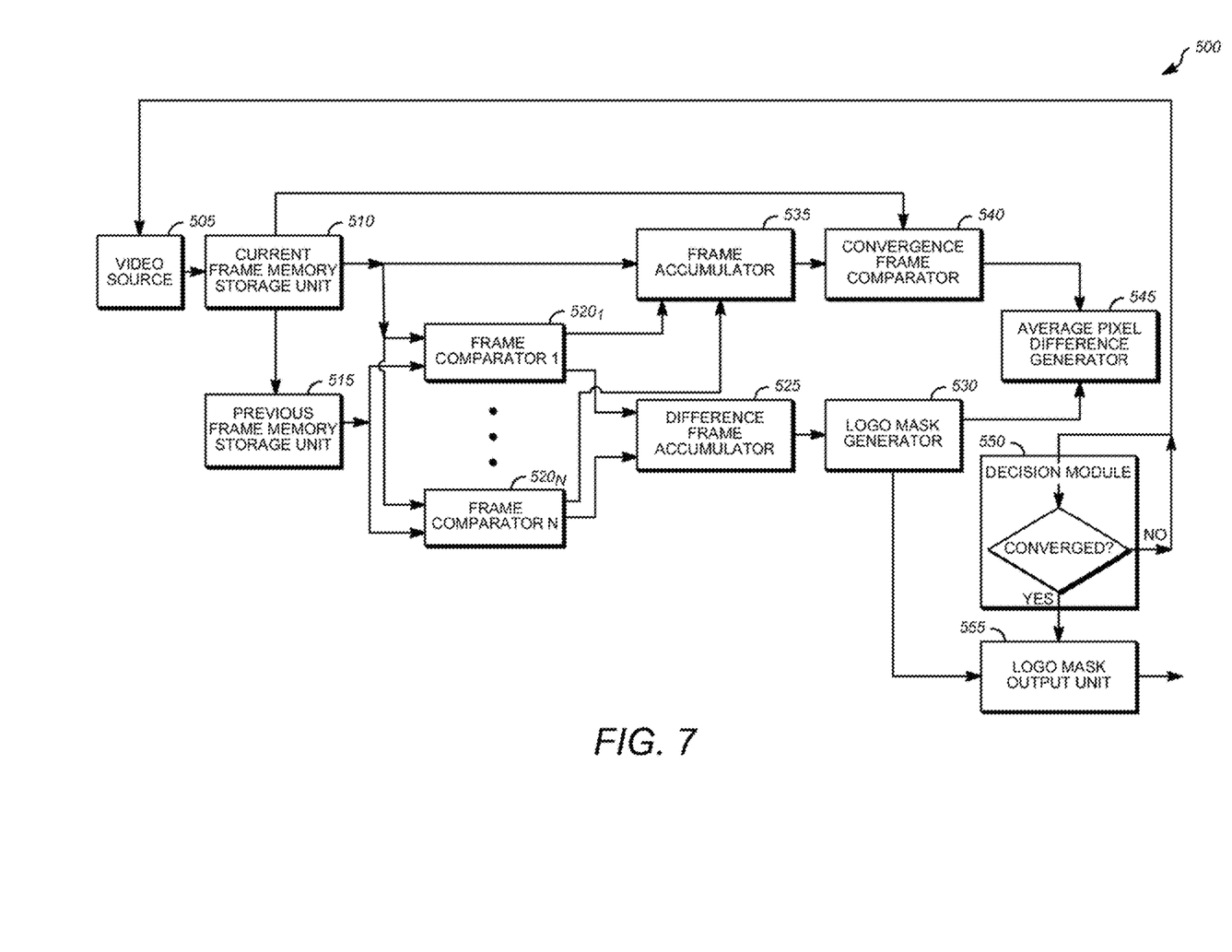
FIG. 7 is a simplified block diagram of one example of a graphical element detector.

FIG. 7 is a simplified block diagram of one example of a graphical element detector 500 that may be employed to implement the methods and techniques described herein. It can be appreciated that this is an aggregated view of functionality across various embodiments. Specific embodiments can vary from the particular form of FIG. 7 without departing from the scope of the disclosure.

A video source 505 provides individual frames of video content to a current frame memory storage unit (e.g., a buffer) 510. As additional frames are received by the current frame memory storage unit 510, the current frame is transferred to a previous frame memory storage unit 515 (e.g., a buffer). In this way as video content is delivered from the video source 505 to the current frame memory storage unit 510, the current frame memory storage unit 510 stores the most recently received frame while previously received frames are transferred to the previous frame memory storage unit 515. Previous frame memory storage unit 515 can store two or more previous frames. That is, previous frame memory storage unit 515 can store up to N previous frames, where N≥2.

The graphical element detector 500 also includes N frame comparators 5201-520N. Each frame comparator 5201-520N receives one of the frames stored in the previous frame memory storage unit 515. Each frame comparator 5201-520N also receives the current frame stored in the current frame memory storage unit 510. The frame comparators 5201-520N generate the absolute difference frames D(n,k) and the weights w(n,k). A difference frame accumulator 525 receives the absolute difference frames D(n,k) and the weights w(n,k) from the frame comparators 5201-520N and generates the accumulation difference frame A(n). The accumulation difference frame A(n) is provided to a logo mask generator 530, which performs the various image processing steps and generates the logo mask(s) based on the accumulation difference frame A(n).

A source frame accumulator 535 also receives the weights w(n,k) from the frame comparators 5201-520N as well as current frame from the current frame memory storage unit 510. The source frame accumulator 535 generates the accumulation frame F(n). Both the accumulation frame F(n) and the current frame Mn are provided to a convergence frame comparator 540 to generate the convergence image |Mn−F|. In one embodiment (not shown in FIG. 7), the convergence frame comparator 540 receives the current logo mask from 530 in calculating the average pixel value difference.

Both the logo mask from the logo mask generator 530 and the convergence image |Mn−F| are provided to an average pixel value difference generator 545, which generates the average pixel value difference for the pixels encompassed by the mask. In this way a graph of the type shown in FIG. 6b can be generated from the average pixel value to determine when this value has stabilized and converged below some threshold, indicating that a sufficient number of frames have been accumulated.

If the average pixel value satisfies the stabilization and convergence criteria, a decision module 550 causes the mask generated by the logo mask generator 530 to be output from the graphical element detector 500 so that it may be used for any of a variety of different purposes. For instance, the logo mask may be provided to a video encoder to facilitate the encoding of the logo region of the video content. In another example, the logo mask and the logo pixel template are used to determine if the logo is present in a video frame in order to classify the video frame into different categories, such as a program content frame or an advertisement frame.

If on the other hand the average pixel value does not satisfy the stabilization and convergence criteria, the decision module 550 causes the next frame from the video source to be transferred to the current frame memory storage unit 510 so that another frame can be accumulated and included in the analysis. In this way the process continues until the stabilization and convergence criteria are satisfied and the correctly detected logo region has been output from the graphical element detector 500 by a logo mask output unit 555. Note that the detected logo mask provided by the logo mask output unit 555 may include two components: one is the logo mask pixels in the form of a binary image, where each bright pixel indicates that the pixel position is a logo pixel; another is the logo template, which carries the logo pixel value at each logo pixel position specified by the logo mask.

Referring again to previous frame memory storage unit 515, it was noted that up to N previous frames, where N≥2, can be stored. Once the storage unit 515 is full, frames can be selected for removal in any of a number of different ways in order to allow more recent frames to be transferred in from the video source 505. For example, in one embodiment, frames can be removed in accordance with a first in, first out (FIFO) procedure. In another embodiment frames associated with the smallest weight w(n,k) may be removed first. In yet another embodiment a combination of FIFO principles and a smallest weight criterion may be used. For instance, frames that have been in the storage unit 515 for more than some specified duration may be removed first regardless of their weight. Of course, other criteria may be employed instead or in addition to the examples enumerated above.

In an alternative embodiment, the previous frame memory storage unit 515 stores exactly one frame. If w(n,k)<T, where T is a configurable threshold, the stored frame is removed and replaced with the current frame. Otherwise, the stored frame is retained in the previous memory storage unit 515.

The graphical element detector 500 shown in FIG. 7 employs one frame comparator 520 for each frame stored in the previous frame memory storage unit 515. In this way each previous frame can be compared to the current in parallel. In one alternative embodiment only a single frame comparator 520 may be employed, in which case the previous frames are compared to the current frame in a serial manner. In yet another embodiment two or more multiple frame comparators 520 may be employed, with the total being less than the total number of previous frames N that are stored so that a combination of parallel and serial processing may be performed.

Figure 8:
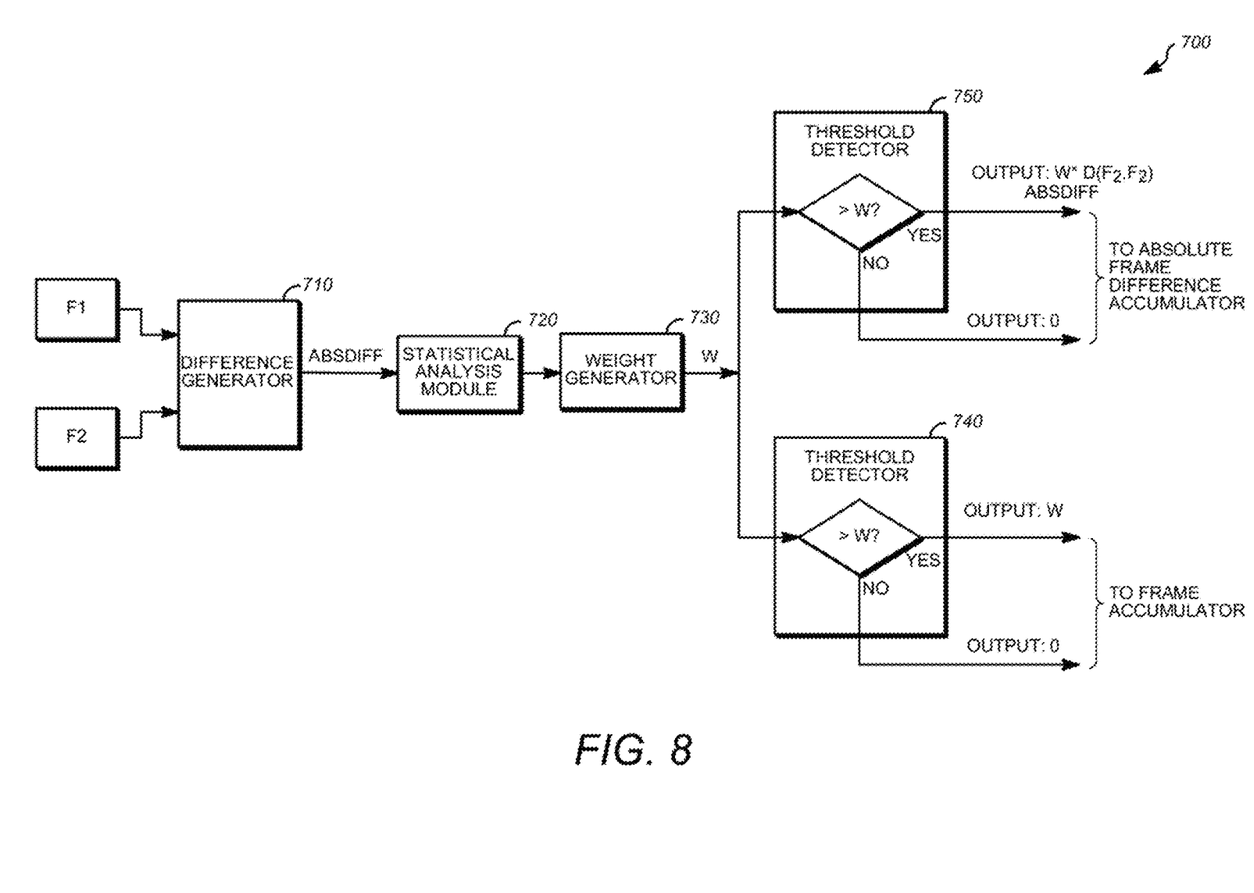
FIG. 8 shows a simplified block diagram of one example of a frame comparator that may be employed in the graphical element detector of FIG. 7.

FIG. 8 shows one example of a frame comparator 700 that may be employed in the graphical element detector 500. As shown, a difference generator 710 receives a current frame and a previous frame, denoted in FIG. 8 as frames F1 and F2, and takes the absolute value of difference between corresponding pixel values for each pixel in the two frames to determine the absolute difference frame D(F1, F2) between the two frames. The absolute difference frame between frames F1 and F2 is provided to a statistical analysis module 720 to generate the histogram H.

A weight generator 730 receives the histogram H from which the weight w(F1, F2) to be assigned to the absolute frame difference D(F1, F2) is calculated. A first threshold detector 740 compares the weight to the threshold W, which is configurable parameter that has been previously selected. If the weight is greater than the threshold W, it sends the weight to frame accumulator 535 shown in FIG. 7. If the weight is less than the threshold W, the threshold detector 740 sends a weight of zero to the frame accumulator 535.

A second threshold detector 750 also compares the weight to the threshold W. If the weight is greater than the threshold W, it sends the value w(F1,F2)*D(F2,F2) to the difference frame accumulator 525 so that it can be used in determining the accumulation difference frame. If the weight is less than the threshold W, the threshold detector 750 sends a weight of zero to the difference frame accumulator 525.

Figure 9:
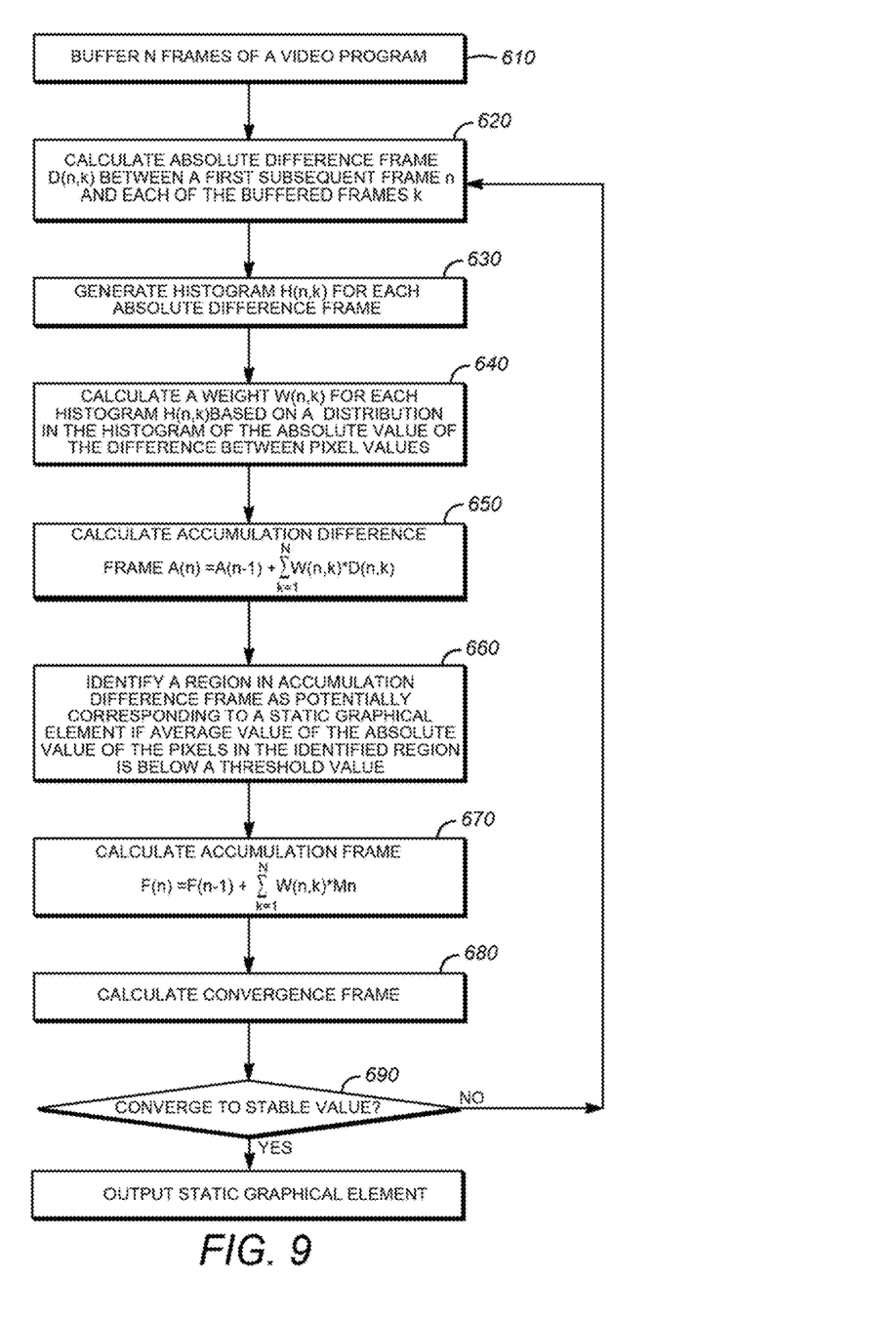
FIG. 9 is a flowchart showing one example of a method for detecting a static graphical element in a sequence of video frames that constitutes a video program.

FIG. 9 is a flowchart showing one example of a method for detecting a static graphical element in a sequence of video frames that constitutes a video program. At block 610 N frames of a video program are buffered, where N≥2. An absolute difference frame D(n,k) is calculated between a first subsequent frame n (which may be the current frame) and each of the buffered frames k at block 620. The calculation is performed by determining an absolute value of the difference between pixel values for corresponding pixels in at least a portion (e.g., the lower half) of the first subsequent frame n and each of the buffered frames k. At block 630 a histogram H(n,k) is generated for each absolute difference frame. For each histogram H(n,k), a weight w(n,k) is calculated at block 640 based on a distribution in the histogram of the absolute value of the difference between pixel values. An accumulation difference frame A (where A(n) has been defined above) is calculated at block 650. A region in the accumulation difference frame is identified as potentially corresponding to a static graphical element at block 660 if the average value of the absolute value of the pixels in the identified region of the accumulation difference frame is below a threshold value.

Next, at block 670 an accumulation frame F is generated (where F(n) has been defined above). At block 680 a convergence frame is also generated. The convergence frame has pixel values determined from an absolute value of a difference in pixel values between corresponding pixels in the first subsequent frame n and the accumulation frame F(n). If an average pixel value in a portion of the convergence frame over the identified region converges to a stable value as additional subsequent frames are added to the accumulation frame, then the static graphical element has been successfully identified. If the average pixel value has not yet converged to a stable value, the process returns to block 620 and is repeated for a second subsequent frame n. This process may be repeated for additional subsequent frames as needed to obtain until the average pixel value has converged to a stable value. In some cases the process may continue to run for the entire duration of the process, regardless of whether the average pixel value has converged to a stable value.

Figure 10:
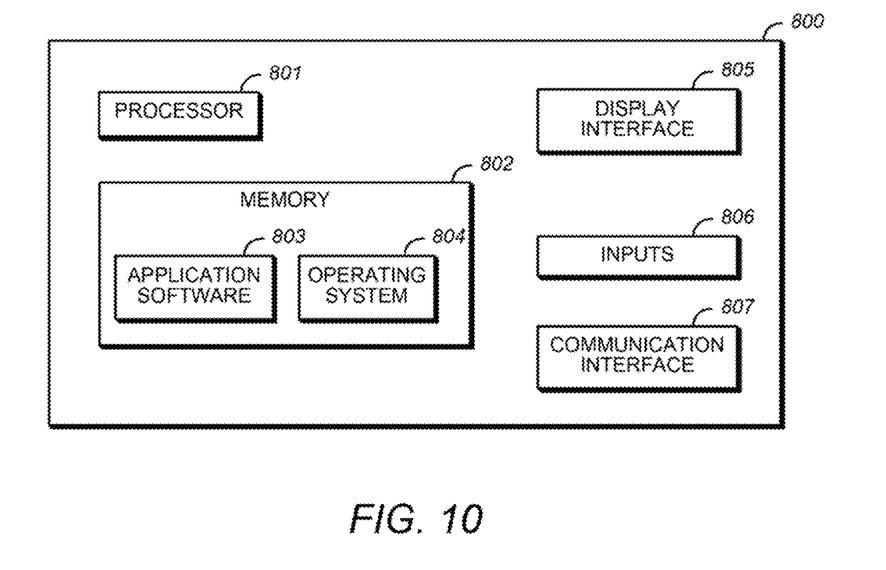
FIG. 10 shows one example of a computing-based device or system that can be used to execute a sequence of instructions for practicing various embodiments of the invention.

The execution of the sequences of instructions required to practice the embodiments can be performed by a computing-based device or system such as that shown in FIG. 10. The computer system provides a block diagram of functional components that can be used to enable embodiments of the present invention.

The computing-based device 800 comprises one or more inputs 806 which are of any suitable type for receiving media content, Internet Protocol (IP) input, activity tags, activity state information, resources or other input. The device also comprises communication interface 807 to enable the device to communicate with one or more other entity using any suitable communications medium.

Computing-based device 800 also comprises one or more processors 801 which may be microprocessors, controllers or any other suitable type of processors for processing computing executable instructions to control the operation of the device in order to provide a search augmentation system. Platform software comprising an operating system 804 or any other suitable platform software may be provided at the computing-based device to enable application software 803 to be executed on the device.

The computer executable instructions may be provided using any computer-readable media, such as memory 802. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output is also provided such as an audio and/or video output to a display system integral with or in communication with the computing-based device. A display interface 805 is provided to control a display device to be used in conjunction with the computing device. The display system may provide a graphical user interface, or other user interface of any suitable type.

As disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable storage media for storing information. The term "computer-readable storage medium" includes, but is not limited to, portable or fixed storage devices, optical storage devices, wireless channels, a SIM card, other smart cards, and various other mediums capable of storing, containing, or carrying instructions or data. However, computer readable storage media do not include transitory forms of storage such as propagating signals, for example.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable storage medium and executed by one or more processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable storage media containing instructions which, when executed by the one or more processors performs a method, comprising:
    buffering N frames of a video program, where N≥2;
    calculating an absolute difference frame D(n,k) between a first subsequent frame n and each of the buffered frames k by determining an absolute value of a difference between pixel values for corresponding pixels in at least a portion of the first subsequent frame n and each of the buffered frames k;
    generating a histogram H(n,k) for each absolute difference frame;
    for each histogram H(n,k) calculating a weight w(n,k) based on a distribution in the histogram of the absolute value of the difference between pixel values;
    repeating the calculating of the absolute difference frame, the histograms and the weights for at least a second subsequent frame n;
    generating an accumulation difference frame A, where $$A(n) = A(n-1) + \sum_{k=1}^{N} w(n,k) * D(n,k)$$

and
    identifying a region in the accumulation difference frame as a static graphical logo if an average value of the absolute value of the pixels in the identified region of the accumulation difference frame is below a threshold value.

2. The one or more computer-readable storage media of claim 1, wherein identifying the region as a static graphical logo includes identifying the region as a static graphical logo if at least one additional criterion is satisfied, and further comprising: generating an accumulation frame F, where $$F(n) = F(n-1) + \sum_{k=1}^{N} w(n,k) * Mn$$

and Mn is a matrix of pixel values for the current frame n, and generating a convergence frame having pixel values determined from an absolute value of a difference in pixel values between corresponding pixels in the second subsequent frame n and the accumulation frame F(n), wherein the at least one additional criterion is satisfied if an average pixel value in a portion of the convergence frame over the identified region converges to a stable value as additional subsequent frames are added to the accumulation frame.

3. The one or more computer-readable storage media of claim 1, wherein generating the accumulation difference frame A includes excluding from summation any term that includes a weight below a threshold value.

4. The one or more computer-readable storage media of claim 2, wherein generating the accumulation frame F includes excluding from summation any term that includes a weight below a threshold value.

* * * * *